Oct. 28, 1952     A. L. LITTIG     2,615,246
LAWN TRIMMER
Filed July 20, 1950
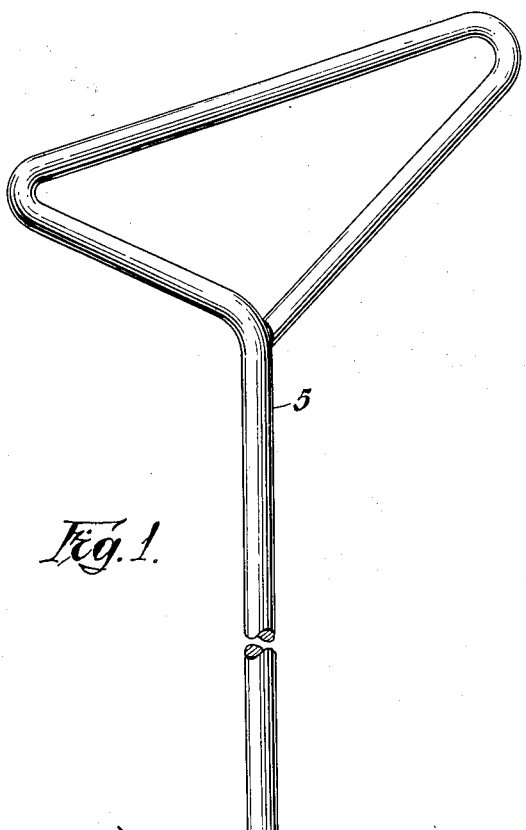
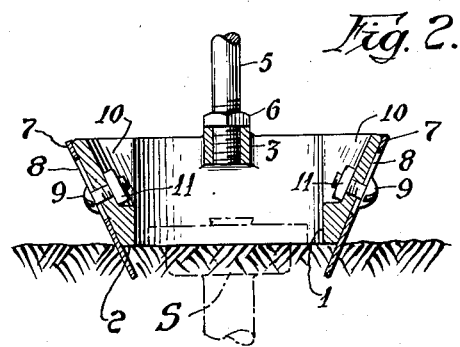
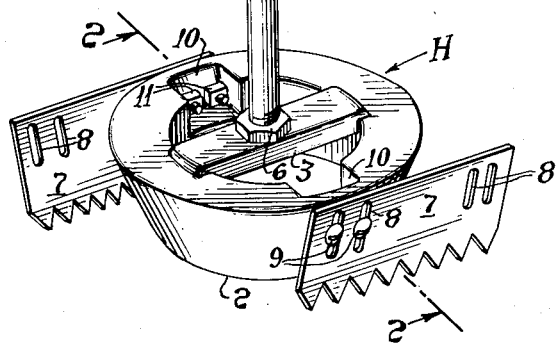
INVENTOR.
Arthur L. Littig,
BY Wilfred E. Lawson
Attorney.

Patented Oct. 28, 1952

2,615,246

UNITED STATES PATENT OFFICE 2,615,246

LAWN TRIMMER

Arthur L. Littig, Altadena, Calif.

Application July 20, 1950, Serial No. 174,895

4 Claims. (Cl. 30—300)

This invention relates to a lawn trimmer and it is primarily an object of the invention to provide a device for trimming grass or the like away from the heads of built-in lawn sprinkler systems so that said growth will not interfere with the flow of the sprinklers.

It is also an object of the invention to provide a device of this kind having a part to be turned around a sprinkler head and wherein said part carries a cutting means for the turf immediately surrounding the sprinkler head.

The invention consists in the details of construction and in the combination and arrangement of the several parts of my improved lawn trimmer whereby certain advantages are attained, as will be hereinafter more fully set forth.

In order that my invention may be better understood, I will now proceed to describe the same with reference to the accompanying drawings, wherein:

Figure 1 is a view in perspective of a trimmer constructed in accordance with an embodiment of the invention, and Figure 2 is a fragmentary sectional view taken substantially on the line 2—2 of Figure 1.

In the embodiment of the invention as illustrated in the accompanying drawings, H denotes an annular head of desired dimension and frusto-conical in form. The head H has an axial passage 1 of a diameter to closely fit over and around a sprinkler head S such as used in connection with built-in sprinkler systems. The smaller end of the head H has a face 2 which rests upon the turf or the like to be trimmed when the invention is in use.

The large or top end of the passage 1 of the head H has fixed thereacross a bar member 3 herein disclosed as having its extremities integral with the head H. The member 3 is disposed radially across the passage 1 and in threaded engagement with the central portion of the member 3 is one end portion of an elongate handle number 5.

Carried by the handle member 5 is a conventional lock nut 6 engaging the cross member 3.

Attached to the tapered outer surface of the head H at substantially diametrically opposite locations are end portions of elongate flat cutting blades 7. These blades 7, when applied, are tangential to the head H and are substantially straight from end to end and extend in opposite directions with respect to the head H.

Each of the blades 7 has a toothed lower or cutting edge and in each end portion each blade is provided with a pair of transversely disposed parallel slots 8. Extending through the slots 8 from the outer sides of the blades are the headed bolts 9 which extend through the adjacent portions of the head H into the inwardly opening pockets 10.

Threaded on the inner ends of the bolts 9 and located in the pockets 10 are the holding nuts 11. The applied nuts 11 and the associated inner end portions of the shanks 9 are housed within the pockets 10 thus avoiding any obstruction of the passage 1.

Each of the blades 7 is herein disclosed as rectangular and of a width whereby the toothed or cutting edge of the applied blade extends below the smaller end of the head H. This extension of the blade 7 may be regulated or adjusted as desired within the limits afforded by the slots 8 and in accordance with the desired depth of cut.

By having slots 8 at both end portions of a blade 7 said blade may be readily reversed. This is of importance after the extended portion of an applied blade has been unduly worn away.

In practice the head H is positioned around a sprinkler head S so that upon turning or rotating the head through the medium of the handle member 5, the blades 7 will neatly remove a circular segment of turf away from the head S.

From the foregoing description it is thought to be obvious that a lawn trimmer constructed in accordance with my invention is particularly well adapted for use by reason of the convenience and facility with which it may be assembled and operated.

I claim:

1. A device for trimming sod from around a sprinkler, comprising a frusto-conical body having an axial passage therethrough and positioned when in use with its smaller end down to rest on the sod, a handle member attached to the larger end of said body to extend upwardly therefrom, a pair of elongate blades, each having a longitudinal cutting edge, and means securing an end of each blade to the inclined outer face of the body to extend tangentially of the body face, said blades being joined to the body at opposite sides of the latter and having their free ends extending in opposite directions.

2. The invention according to claim 1, wherein the securing means comprises bolt members, the blades having openings for the bolts to pass through the blades, the body having pockets formed therein from the passage, said bolts terminating in the pockets, and nuts on the terminal ends of the bolts and lying within the pockets.

3. The invention according to claim 2, wherein said blade openings are in the form of slots extending transversely of the blades to permit vertical adjustment of the blades on the body, the slots being adjacent to both ends of the blades.

4. The invention according to claim 1, wherein the cutting edge of each blade comprises teeth formed along the edge of the blade.

ARTHUR L. LITTIG.

REFERENCES CITED

The following references are of record in the file of this patent:

UNITED STATES PATENTS

| Number | Name | Date |
|---|---|---|
| 233,931 | Hubby | Nov. 2, 1880 |
| 1,064,790 | Tucker | June 17, 1913 |
| 1,480,151 | Cosman | Jan. 8, 1924 |
| 1,765,288 | Schmidt | June 17, 1930 |

FOREIGN PATENTS

| Number | Country | Date |
|---|---|---|
| 217,405 | Switzerland | Feb. 2, 1942 |